United States Patent
Li et al.

(10) Patent No.: US 8,259,471 B2
(45) Date of Patent: Sep. 4, 2012

(54) CONVERTER THAT ACTUATES A SWITCH CORRESPONDING TO A DETECTED VALLEY OF A RESONANCE WAVEFORM

(75) Inventors: Shanmei Li, Gyeonggi-do (KR); Jin-Tae Kim, Seoul (KR); Gwan-Bon Koo, Gyeonggi-do (KR); Gyoung-Soo Park, Seoul (KR)

(73) Assignee: Fairchild Korea Semiconductor Ltd., Bucheon, Kyungki-Do (KR)

( * ) Notice: Subject to any disclaimer, the term of this patent is extended or adjusted under 35 U.S.C. 154(b) by 375 days.

(21) Appl. No.: 12/424,195

(22) Filed: Apr. 15, 2009

(65) Prior Publication Data

US 2009/0296437 A1 Dec. 3, 2009

(30) Foreign Application Priority Data

May 29, 2008 (KR) .......................... 10-2008-0050333

(51) Int. Cl.
*H02M 3/335* (2006.01)
(52) U.S. Cl. .................................................. 363/21.12
(58) Field of Classification Search .............. 363/16–20, 363/21.01, 21.02, 21.08, 21.12, 21.16, 21.17, 363/56.01, 56.11, 89, 95, 97; 323/222, 224, 323/225, 271, 282–287; 327/108, 310, 543
See application file for complete search history.

(56) References Cited

U.S. PATENT DOCUMENTS

| | | | |
|---|---|---|---|
| 5,075,837 A | 12/1991 | Feldtkeller | |
| 5,465,188 A * | 11/1995 | Pryor et al. | 361/18 |
| 5,734,564 A | 3/1998 | Brkovic | |
| 6,256,210 B1 | 7/2001 | Strijker et al. | |
| 6,341,073 B1 | 1/2002 | Lee | |
| 6,469,484 B2 * | 10/2002 | L'Hermite et al. | 323/284 |
| 6,900,995 B2 * | 5/2005 | Muegge et al. | 363/21.05 |
| 7,388,763 B2 * | 6/2008 | Nakamura | 363/21.15 |
| 7,768,802 B2 * | 8/2010 | Lee et al. | 363/21.16 |
| 2006/0198167 A1 * | 9/2006 | Nakamura | 363/16 |
| 2007/0285953 A1 | 12/2007 | Koo et al. | |
| 2009/0231894 A1 * | 9/2009 | Moon et al. | 363/89 |

FOREIGN PATENT DOCUMENTS

KR  10-2008-0022960  *  3/2008 ...................... 363/89
* cited by examiner

*Primary Examiner* — Adolf Berhane
*Assistant Examiner* — Yemane Mehari
(74) *Attorney, Agent, or Firm* — Alston & Bird LLP

(57) ABSTRACT

A converter is provided including: a first switch; an energy transmitting element for converting input energy into output energy according to the switching of the first switch; and a switching controller for detecting a time when a voltage between a first terminal and a second terminal of the first switch reaches a valley of a resonance waveform, and actuating the first switch corresponding to one of the detected valleys of the resonance waveform. The switching controller includes: a valley detector for changing the state of the output signal whenever a voltage between a first terminal and a second terminal of the first switch reaches a valley of the resonance waveform; and a PWM controller for actuating the first switch corresponding to an output signal of the valley detector.

7 Claims, 3 Drawing Sheets

CONVERTER THAT ACTUATES A SWITCH CORRESPONDING TO A DETECTED VALLEY OF A RESONANCE WAVEFORM

CROSS-REFERENCE TO RELATED APPLICATION

This application claims priority to and the benefit of Korean Patent Application No. 10-2008-0050333 filed in the Korean Intellectual Property Office on May 29, 2008, the entire contents of which are incorporated herein by reference.

BACKGROUND OF THE INVENTION (a) Field of the Invention

The present invention relates to a converter. More particularly, the present invention relates to a quasi-resonant converter.

(b) Description of the Related Art

A converter is a power device for converting an AC signal and a DC signal, and it is used in a switching mode power supply (SMPS). It includes an AC/DC converter which converts an AC signal into a DC signal, a DC/DC converter which converts a DC signal into another DC signal, and an inverter which converts a DC signal into an AC signal.

In general, the converter includes a transformer for receiving a DC voltage, and a main switch which is coupled to the primary coil of the transformer. The converter maintains the DC output voltage or current of an output unit by controlling a turn-on time of a main switch with a feedback loop to transmit a voltage or a current of the output unit through a photocoupler and a shunt regulator coupled to a secondary coil of the transformer.

A general quasi-resonant converter is driven to turn on a main switch when the voltage difference at both terminals of the main switch reaches the valley of a resonance waveform for the $1^{st}$ time after the main switch is turned off, and it thereby minimizes power consumption caused by switching of the main switch.

However, the general quasi-resonant converter greatly increases the switching frequency of the main switch when the input voltage exceeds a predetermined level or a load at the output terminal of the converter becomes very small. Increased switching frequency resultantly increases power consumption caused by switching of the main switch.

Recently, in order to solve the problem, techniques for turning on the main switch when a voltage difference at both terminals of the main switch reaches the second valley or the third valley other than the first valley to avoid increasing switching frequency have been proposed.

However, the proposed techniques require a complicated circuit configuration to detect the time instant when the voltage difference reaches the valley of the resonance waveform, and hence, the production cost and layout area of the converter are increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switching converter for detecting a time instant when a voltage at both terminals of a main switch reaches the valley of a resonance waveform by using a simple circuit.

An exemplary embodiment of the present invention provides a converter including: a first switch; an energy transmitting element for converting input energy into output energy according to switching of the first switch; and a switching controller for detecting a time when a voltage between a first terminal and a second terminal of the first switch reaches a valley of a resonance waveform, and turning on the first switch corresponding to one of the detected valleys of the resonance waveform.

The switching controller includes: a valley detector for changing the output signal from Low to High whenever a voltage between a first terminal and a second terminal of the first switch reaches a valley of the resonance waveform, and a PWM controller for turning on the first switch corresponding to an output signal of the valley detector.

According to the present invention, without increasing production cost and layout area, a valley is detected and a switch is turned on corresponding to the detected valley, thereby minimizing loss caused by switching.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A converter according to an exemplary embodiment of the present invention will now be described with reference to accompanying drawings.

Figure 1:
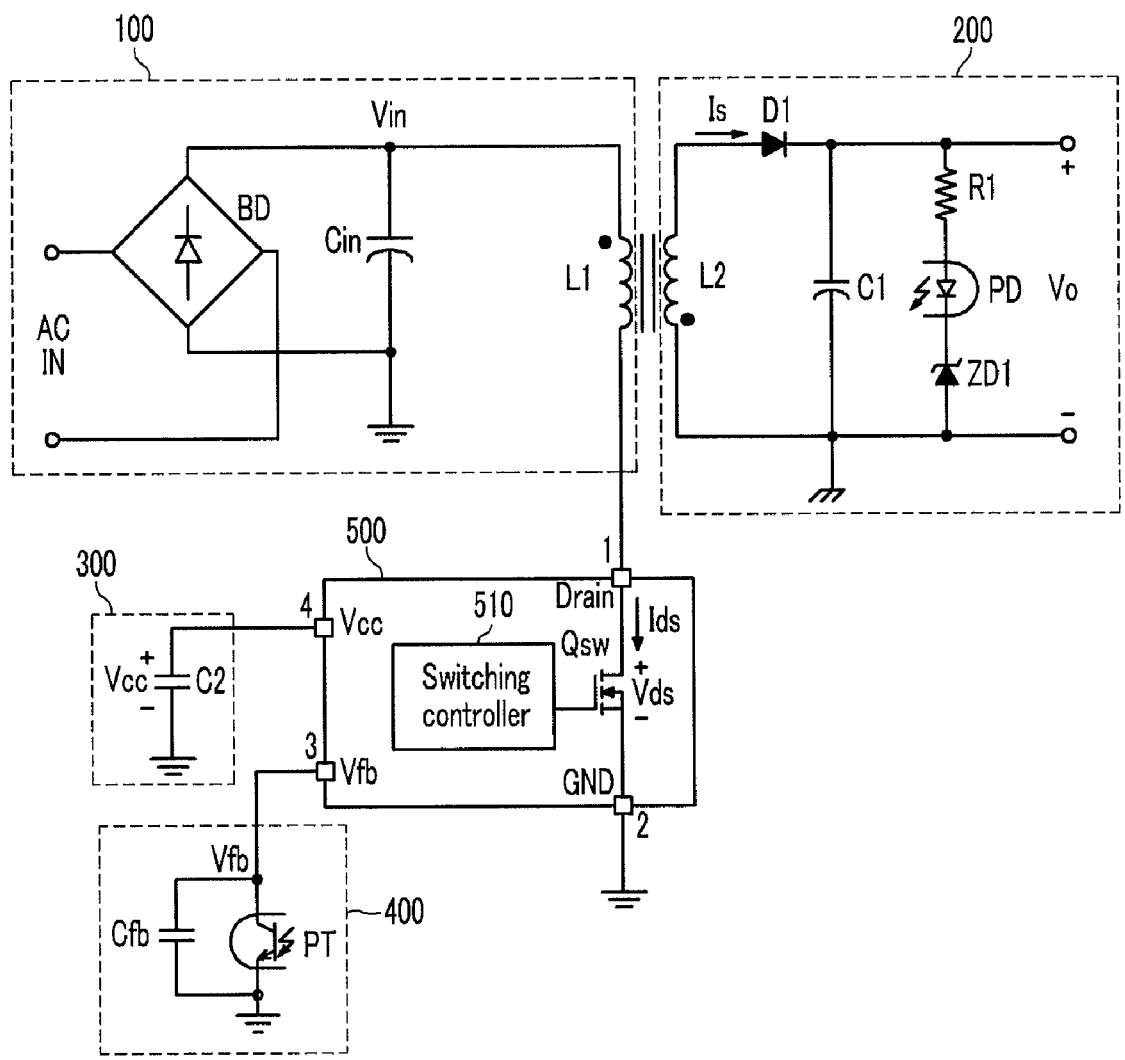
FIG. 1 shows a configuration of a converter according to an exemplary embodiment of the present invention.

FIG. 1 shows a configuration of a converter according to an exemplary embodiment of the present invention.

As shown in FIG. 1, the converter includes a power supply 100, an output unit 200, a bias voltage supply 300, a feedback circuit unit 400, and a switch control device 500.

The power supply 100 includes a bridge diode BD for rectifying an AC input voltage, a capacitor Cin for smoothing a rectified voltage, and a primary coil L1 of a transformer having a first terminal coupled to the capacitor Cin.

The output unit 200 includes a diode D1 having an anode coupled to a first terminal of a secondary coil L2 of the transformer, a capacitor C1 coupled between a cathode of the diode D1 and a ground, a resistor R1 having a first terminal coupled to the cathode of the diode D1, a photodiode PD having an anode coupled to a second terminal of the resistor R1, and a Zener diode ZD1 having a cathode coupled to a cathode of the photodiode PD and an anode coupled to the ground terminal. The second terminal of a secondary coil L2 of transformer is coupled to the ground terminal. Here, the voltage at the capacitor C1 is an output voltage Vo, and the current flowing to the photodiode PD depends on the output voltage Vo. The photodiode PD forms a photocoupler together with a photo-transistor PT of the feedback circuit unit 400, and provides information corresponding to the output voltage Vo to the feedback circuit unit 400.

The bias voltage supply 300 includes a capacitor C2 coupled between a bias voltage input terminal I/O #4 of the switch control device 500 and the ground terminal, and supplies the bias voltage Vcc charged in the capacitor C2 to the bias voltage input terminal I/O #4 of the switch control device 500. For reference, differing from FIG. 1, the bias voltage supply 300 is formed to include the coil of the transformer, and it supplies the bias voltage Vcc to the bias voltage input terminal I/O #4 by using the voltage induced from the primary coil L1 and the secondary coil L2 of the transformer.

The feedback circuit 400 includes a photo transistor PT for forming a photocoupler together with a photodiode PD of the output unit 200, and a capacitor Cfb coupled in parallel to the photo transistor PT, and supplies the feedback voltage Vfb charged in the capacitor Cfb to the feedback voltage input terminal I/O #3 of the switch control device 500. The phototransistor PT is driven by receiving the light (infrared) emitted by the photodiode PD of the output unit 200. For example, when the output voltage Vo is increased, the feedback voltage Vfb charged in the capacitor Cfb is reduced, and when the output voltage Vo is reduced, the feedback voltage Vfb charged in the capacitor Cfb is increased.

The switch control device 500 includes a switching controller 510 and a switching transistor Qsw, and has four input and output terminals including a drain terminal I/O #1, a ground GND terminal I/O #2, a feedback voltage Vfb input terminal I/O #3, and a bias voltage Vcc input terminal I/O #4. The drain terminal I/O #1 is coupled to a second terminal of the primary coil L1 of the transformer, and the ground GND terminal I/O #2 is grounded. The feedback voltage Vfb input terminal I/O #3 is coupled to a node of the photo transistor PT and the capacitor Cfb of the feedback circuit unit 400. The bias voltage Vcc input terminal I/O #4 is coupled to a first terminal of the capacitor C2.

Figure 2:
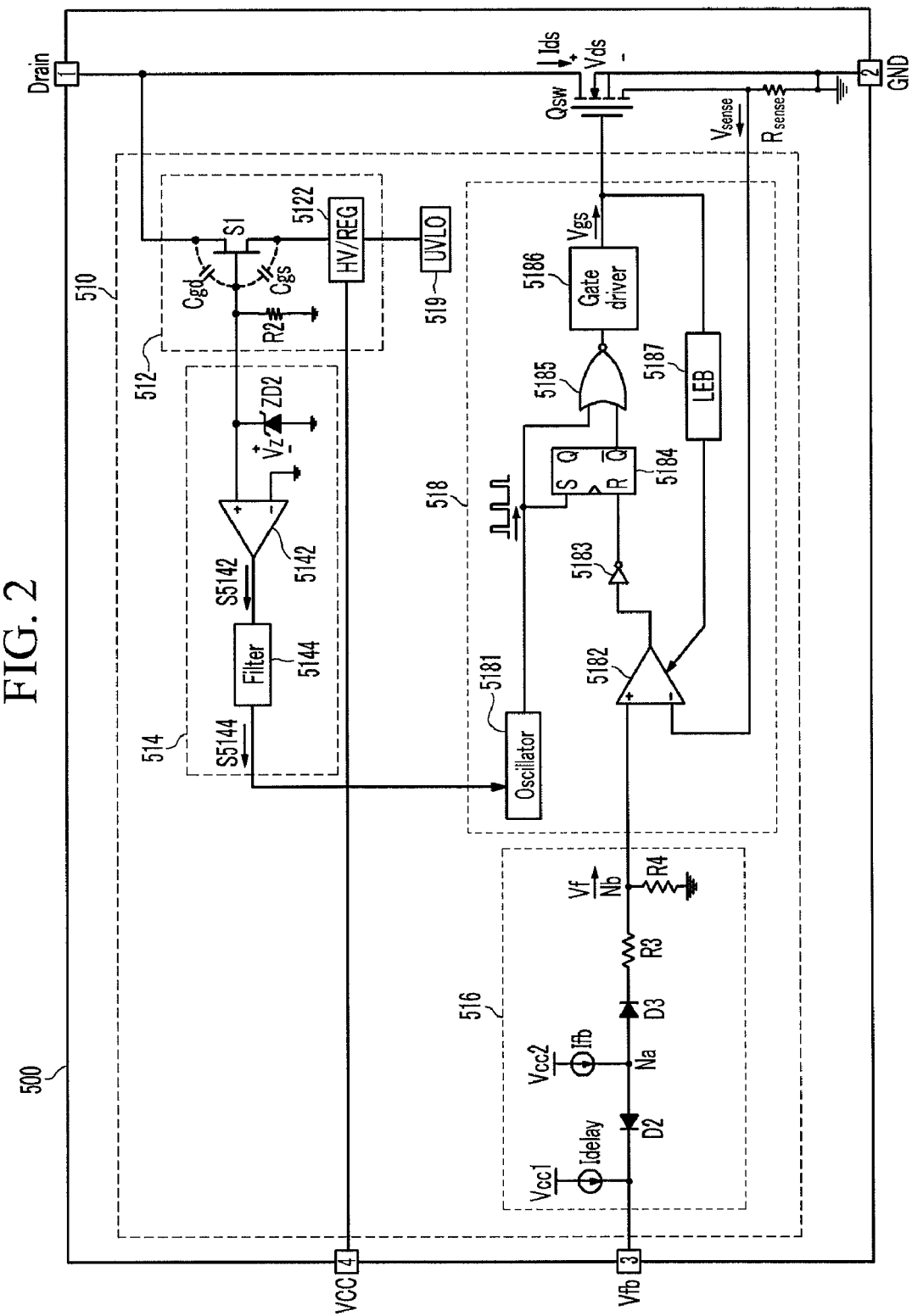
FIG. 2 shows a switch control device according to an exemplary embodiment of the present invention.

With reference to FIG. 2, a switch control device 500 according to an exemplary embodiment of the present invention will now be described.

FIG. 2 shows a switch control device according to an exemplary embodiment of the present invention.

As shown in FIG. 2, the switch control device 500 includes a switching controller 510 and a switching transistor Qsw.

The switching transistor Qsw has a drain coupled to the primary coil L1 through the drain terminal I/O #1 and a source coupled to the ground terminal through the ground GND terminal I/O #2, and is controlled to be turned on/off by the switching controller 510.

The switching controller 510 includes a startup circuit 512, a valley detector 514, a feedback signal generator 516, a PWM controller 518, and an under voltage lockout (UVLO) unit 519.

The startup circuit 512 includes a switch S1, a high voltage regulator (HV/REG) 5122, and a resistor R2.

The switch S1 has a drain coupled to a drain of the switching transistor Qsw. The regulator 5122 is coupled to a source of the switch S1. The resistor R2 has a first terminal coupled to a gate of the switch S1 and a second terminal coupled to the ground terminal. For reference, in FIG. 2, Cgd and Cgs respectively indicate parasitic capacitance between the gate and the drain of the switch S1 and parasitic capacitance between the gate and the source of the switch S1.

In FIG. 2, the switch S1 is shown with a JFET, which can be obviously substituted for another switch having a similar structure and performing the same operation.

The UVLO unit 519 senses a voltage level of the bias voltage, and stops the switching controller 510 when the bias voltage becomes less than a predetermined voltage level. Since the bias voltage is used as a power source for driving the switching controller 510, when the bias voltage falls below a predetermined level, it becomes a cause of malfunction of the switching controller 510. Therefore, the UVLO unit 519 stops the switching controller 510 when the bias voltage becomes less than the predetermined voltage level, thereby preventing the malfunction of the switching controller 510.

The valley detector 514 includes a Zener diode ZD2, a comparator 5142, and a filter 5144.

The Zener diode ZD2 has a cathode coupled to the gate of the switch S1 and an anode coupled to the ground terminal. The comparator 5142 has a non-inverting input terminal (+) coupled to a cathode of the Zener diode ZD2 and an inverting input terminal (−) coupled to the ground terminal. The filter 5144 has an input terminal coupled to an output terminal of the comparator 5142 and an output terminal coupled to an oscillator 5181 of the PWM controller 518. The filter 5144 is a low pass filter and it filters noise of the output signal of the comparator 5142 to extract a valley detecting signal, and transmits it to the oscillator 5181.

Here, the valley detecting signal indicates that the Vds voltage has reached the valley. In detail, the comparator 5142 changes the level of the output signal from Low to High when the voltage Vds between the drain and the source of the switching transistor Qsw reaches the valley. The output signal S5142 of the comparator 5142 passes through the filter 5144, and hence, the valley detecting signal S5144 from the filter 5144 is changed from Low to High when the Vds voltage reaches the valley. Hereinafter, the high level output signal S5144 by the filter 5144 will be referred to as a valley detecting signal. When the Vds voltage reaches the valley, the valley detector 514 outputs the valley detecting signal to the oscillator 5181 so as to turn on the switching transistor Qsw. The oscillator 5181 ignores the input of the valley detecting signal until a predetermined time has passed after the switching transistor Qsw is turned off, and after the predetermined time, switching transistor Qsw will be turned on if the valley detecting signal is input, which will be described later.

The feedback signal generator 516 includes current sources Idelay and Ifb, diodes D2 and D3, and resistors R3 and R4.

The current source Idelay is coupled between the power source Vcc1 and the feedback voltage Vfb input terminal I/O #3 for supplying the Vcc1 voltage, and supplies the current to the feedback circuit unit 400. The diode D2 has a cathode coupled to a node between the current source Idelay and the feedback voltage Vfb input terminal I/O #3. The diode D3 has an anode coupled to an anode of the diode D2. The current source Ifb is coupled between a node Na and the power source Vcc2. Na is a node between an anode of the diode D2 and an anode of the diode D3 for supplying the Vcc2 voltage. The resistor R3 has a first terminal coupled to a cathode of the diode D3 and a second terminal coupled to a non-inverting input terminal of the comparator 5182 of the PWM controller 518. The resistor R4 has a first terminal coupled to a second terminal of the resistor R3 and a second terminal coupled to the ground terminal. The current source Ifb supplies the current to the feedback circuit unit 400 and the resistors R3 and R4. Here, a node between the resistor R3 and the resistor R4 is an output terminal of the feedback signal generator 516. Hereinafter, a node between the resistor R3 and the resistor R4 will be called a node Nb, and a voltage applied to the node Nb corresponding to the current output to the resistors R3 and R4 by the feedback signal generator 516 will be referred to as the feedback voltage Vf.

When the feedback voltage Vfb is low, that is, when the voltage at the node Na is greater than the voltage that is the sum of the feedback voltage Vfb and the threshold voltage of the diode D2, the current supplied by the current source Ifb flows to the feedback circuit unit 400 and the resistors R3 and R4 through the diodes D2 and D3.

When the feedback voltage Vfb is increased so that the voltage at the node Na is not greater than the sum of the feedback voltage Vfb and the threshold voltage of the diode D2, the diode D2 is turned off, the current supplied by the current source Ifb flows to the resistors R3 and R4 through the diode D3. As a result, even if the output terminal of the output unit 200 becomes overloaded or shorted the feedback signal Vf can be maintained at a constant voltage The PWM controller 518 includes an oscillator 5181, a comparator 5182, an inverter 5183, an SR flip-flop 5184, a NOR gate 5185, a gate driver 5186, and a leading edge blanking (LEB) signal generator 5187.

The oscillator 5181 generates a pulse signal that is toggled regularly at a predetermined frequency. The oscillator 5181 changes the output signal from High to Low when sensing that the valley detecting signal input by the valley detector 514 is changed from Low to High. When the output signal of the oscillator 1581 becomes Low, the output signal of the NOR gate 5185 becomes High, and the gate control signal Vgs applied to the control electrode of the switching transistor Qsw from the gate driver 5186 becomes High. That is, the switching transistor Qsw is turned on when the Vds voltage reaches the valley.

The oscillator 5181 includes a timer (not shown), and it can be set to neglect the valley detecting signal input from the valley detector 514 during a time established by the timer after the switching transistor Qsw is turned off, and if nth valley detecting signal happens after the seeting time, switch Qsw will be turned on at the nth valley. That is, the converter according to the exemplary embodiment of the present invention is determined to be turned on at the n-th valley after the switching transistor Qsw is turned off according to the setting time of the timer. Here, if the setting time of the timer is changed, the switching period of the switching transistor Qsw will also be changed.

The comparator 5182 compares the detection signal Vsense input through the inverting input terminal (−) and the feedback signal Vf input through the non-inverting input terminal (+), it outputs a high level signal when the level of the feedback signal Vf is greater than the level of the detection signal Vsense, and it outputs a low level signal when the level of the feedback signal Vf is less than the level of the detection signal Vsense.

The inverter 5183 has an input terminal coupled to an output terminal of the comparator 5182 and the inverter 5183 inverts the output signal of the comparator 5182, and outputs a resultant signal. The output terminal of the inverter 5183 is coupled to a reset terminal R of the SR flip-flop 5184.

The SR flip-flop 5184 outputs a high level or low level signal through the inverting output terminal /Q corresponding to the output signal of the oscillator 5181 input to the set terminal S and the output signal of the inverter 5183 input to the reset terminal R.

The NOR gate 5185 performs a logical operation on two input signals, one is the output signal of the oscillator 5181 and the other is the output signal of the inverting output terminal /Q of the SR flip-flop 5184, and the NOR gate 5185 outputs a resultant signal to the gate driver 5186.

The gate driver 5186 controls the on/off states of the switching transistor Qsw by generating a gate control signal Vgs corresponding to the output signal of the NOR gate 5185 and transmitting it to the control electrode of the switching transistor Qsw.

The LEB signal generator 5187 is used to prevent malfunction caused by the leading edge current spike (i.e., Ids current) when the gate control signal Vgs is changed from Low to High, and the switching transistor Qsw is turned on. That is, the leading edge blanking signal generator 5187 outputs the leading edge blanking signal to the comparator 5182 during the period in which the leading edge current is generated, and the comparator 5182 is operated to neglect the detection signal Vsense corresponding to the Ids current during the period in which the leading edge current is generated.

The switch control device 500 shown in FIG. 2 detects the time instant when the Vds voltage reaches the valley by using the startup circuit 512 and the valley detector 514, which will now be described with reference to the waveform diagram of FIG. 3.

Figure 3:
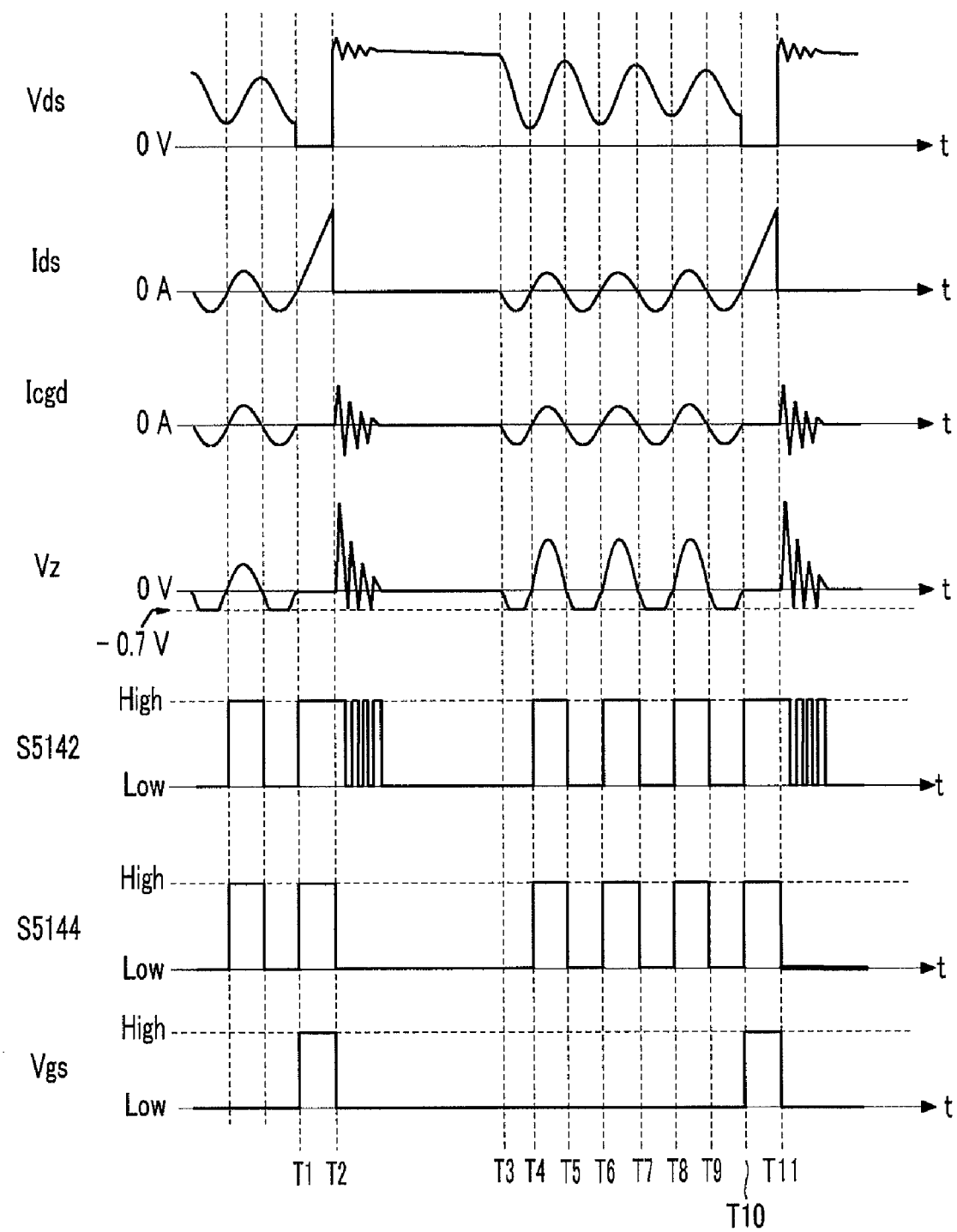
FIG. 3 shows a waveform diagram for showing drive waveforms of constituent elements of a switch control device 500 according to an exemplary embodiment of the present invention.

FIG. 3 shows a waveform diagram for showing drive waveforms of constituent elements of a switch control device 500 according to an exemplary embodiment of the present invention. For reference, the time instant when the switching transistor Qsw is turned off and the time instant when the resonance waveform of Vds reaches the valley are changed according to the input voltage of the converter and the variation of the output terminal load, and FIG. 3 is shown with the assumption that the setting time of the timer (not shown) of the oscillator 5181 is terminated between the third valley and the fourth valley of the Vds voltage corresponding to the input voltage and the output terminal load of the converter , and accordingly the switching transistor Qsw is turned on at the fourth valley. Differing from FIG. 3, if the input voltage and the output terminal load of the converter are varied, the switching transistor Qsw can be turned on at the third valley or the fifth valley. In FIG. 3, Vz represents the voltage applied at the Zener diode ZD2 of the valley detector 514, and Icgd represents the current that flows from the drain of the switch S1 to the gate through the parasitic capacitor Cgd formed between the drain and the gate of the switch S1. Also, S5142 indicates the output signal of the comparator 5142 of the valley detector 514, and S5144 indicates the output signal of the filter 5144 of the valley detector 514.

Not shown in FIG. 3, the voltage Vcgd applied to the parasitic capacitor Cgd between the drain and the gate of the switch S1 corresponds to the Vds voltage shown in FIG. 3.

At the time T1, the output signal Vgs of the gate driver 5186 is changed from Low to High to turn on the switching transistor Qsw. As the switching transistor Qsw is turned on, the current Ids flowing to the switching transistor Qsw is increased, and hence, the voltage Vds between the drain and the source of the switching transistor Qsw is reduced to be 0V.

At the time T1, the voltage between the drain and the source of the switching transistor Qsw reaches the valley, and the output signal S5142 of the comparator 5142 and the output signal S5144 of the filter 5144 at this time are changed from Low to High to turn on the switching transistor Qsw, which will be described in detail at the time T10.

At the time T2, the output signal Vgs of the gate driver 5186 is changed from High to Low to turn off the switching transistor Qsw.

As the switching transistor Qsw is turned off, the current Ids flowing to the switching transistor Qsw is steeply reduced to be 0 A. The voltage Vds between the drain and the source of the switching transistor Qsw is steeply increased.

In this instance, the current flows from the drain of the switch S1 through the parasitic capacitor Cgd of the switch S1 to the ground terminal through the gate of the switch S1 and the Zener diode ZD2, and hence, the Vz voltage is also increased. As the current starts to flow from the drain to the gate of the switch S1, the voltage change at the parasitic capacitor Cgd becomes very great, and the current Icgd flowing to the parasitic capacitor Cgd is greatly changed near the time T2. In this instance, the Vz voltage is greatly changed corresponding to the change of the current Icgd flowing through the parasitic capacitor Cgd. The variation of the Vz voltage near the time T2 is abrupt, and hence, the change of the output signal of the comparator 5142 is great as shown in FIG. 3. Since the filter 5144 is a low pass filter for filtering the abrupt variation, the output signal S5144 of the filter 5144 is not changed to High even if the output signal S5142 of the comparator 5142 is changed to High corresponding to the variation of the Vz voltage near the time T2. That is, the filter 5144 filters the noise of the Vz voltage near the time T2.

At the time T3, the current Is flowing to the diode D1 of the output unit 200 becomes 0 A and the Vds voltage starts to resonate.

The Icgd current is changed into a negative (−) sine curve as the Vds voltage is resonated as a cosine curve. That is, at the time T3 when the Vds voltage falls because of resonance, the Icgd current starts to flow from the gate to the drain of the switch S1, the amount of the current is increased and then is gradually decreased. When the Vds voltage curve reaches the valley, the Icgd current flows from the drain to the gate of the switch S1. For reference, in FIG. 3, when the Icgd current flows from the drain to the gate of the switch S1, it is expressed as a positive value, and when the Icgd current flows from the gate to the drain of the switch S1, it is expressed as a negative value. Accordingly, as shown in FIG. 3, whenever the Vds voltage reaches the valley, the Icgd current zero-crosses 0 A with a positive slope.

The Vz voltage after T3 is proportional to the Icgd current. That is, the Vz voltage is increased when the Icgd current flows from the drain to the gate of the switch S1 with a positive value, and the Vz voltage is reduced and clamped to be −0.7V when the Icgd current flows from the gate to the drain of the switch S1 with a negative value.

When the Vz voltage becomes greater than the ground terminal voltage, the output signal S5142 of the comparator 5142 is changed from Low to High and it is then input to the filter 5144. In this instance, since the output signal S5142 state of the comparator 5142 input to the filter 5144 does not change so fast, the filter 5144 outputs the signal S5142 without filtering it, and the output signal S5144 of the filter 5144 is changed from Low to High. In detail, when the Icgd current is changed from the negative to the positive, that is, at the times T4, T6, T8, and T10 in FIG. 3, the output signal of the filter 5144 is changed from Low to High. On the contrary, when the Icgd current value is changed from positive to negative, that is, at the times T3, T5, T7, and T9 in FIG. 3, the output signal of the filter 5144 is changed from High to Low.

Since the oscillator 5181 ignores the valley detecting signal input within the setting time of the timer, the valley detecting signal output by the filter 5144 is ignored until the time T8 to maintain the output signal of the oscillator 5181 at High and the switching transistor Qsw maintains the turn-off state. This is because the setting time of the timer (not shown) of the oscillator 5181 is assumed to be terminated between the third and the fourth valley of the Vds voltage corresponding to the input voltage and the output terminal load of the current converter. As a result, when the output signal of the filter 5144 is changed from Low to High at the time T10 when the Vds voltage reaches the fourth valley, the oscillator 5181 changes the gate drive 5186 output signal from Low to High, and the switching transistor Qsw is accordingly turned on.

The converter according to the exemplary embodiment of the present invention can detect the valley by using the startup circuit 512 and the valley detector 514. Therefore, it is possible to control the turn on time instant of the switching transistor Qsw for minimizing the switching loss without increasing the production cost and layout area.

While this invention has been described in connection with what is presently considered to be practical exemplary embodiments, it is to be understood that the invention is not limited to the disclosed embodiments, on the contrary. It is intended to cover various modifications and equivalent arrangements included within the spirit and scope of the appended claims.

What is claimed is:

1. A converter comprising:
   a first switch;
   an energy transmitting element for converting input energy into an output signal according to the switching of the first switch; and
   a switching controller for detecting a time instant when a voltage between a first terminal and a second terminal of the first switch reaches a valley of a resonance waveform, and actuating the first switch corresponding to the valley of the resonance waveform, wherein the switching controller includes:
      a valley detector for changing a state of the output signal in response to a control electrode voltage of a second switch having a terminal coupled to the first terminal of the first switch; and
      a pulse width modulation (PWM) controller for actuating the first switch corresponding to a valley detector output signal of the valley detector.

2. The converter of claim 1, wherein the PWM controller is configured to ignore the output signal of the valley detector input for a setting time, and to actuate the first switch when the output signal of the valley detector is changed from the low level to the high level after the setting time.

3. A converter, comprising:
   a first switch;
   an energy transmitting element for converting input energy into an output signal according to the switching of the first switch; and
   a switching controller for detecting a time instant when a voltage between a first terminal and a second terminal of the first switch reaches a valley of a resonance waveform, and actuating the first switch corresponding to the valley of the resonance waveform, wherein the switching controller includes:
      a valley detector for changing a state of the output signal in response to the voltage between the first terminal and the second terminal of the first switch reaching a valley of the resonance waveform, wherein the valley detector includes:
         a Zener diode having a cathode coupled to a control electrode of the second switch and an anode coupled to a first power source for supplying a first voltage; and a comparator for outputting a high level signal when a cathode terminal voltage of the Zener diode is greater than the first voltage; and a pulse width modulation (PWM) controller for actuating the first switch corresponding to a valley detector output signal of the valley detector.

4. The converter of claim 3, wherein the cathode terminal voltage of the Zener diode is changed from a negative level to a positive level when a voltage applied to a parasitic capacitor formed between the terminal and the control electrode of the second switch reaches the valley of the resonance waveform.

5. The converter of claim 4, wherein a voltage applied to the parasitic capacitor of the second switch corresponds to a voltage between the first terminal and the second terminal of the first switch.

6. The converter of claim 3, wherein the valley detector further includes a filter for low pass filtering a comparator output signal of the comparator, and outputting a resultant signal.

7. The converter of claim 3, wherein:

the energy transmitting element comprises a transformer, the first voltage is a ground voltage, and the first terminal of the first switch is coupled to a primary coil of the transformer and the second terminal of the first switch is coupled to the first power source.

* * * * *